US010233002B2

(12) United States Patent
Baenninger et al.

(10) Patent No.: US 10,233,002 B2
(45) Date of Patent: Mar. 19, 2019

(54) FITMENT FOR PACKAGE AND PACKAGE FOR PREPARING A BEVERAGE FROM LIQUID SUPPLIED TO THE PACKAGE BY A DEVICE

(71) Applicant: Nestec S. A., Vevey (CH)

(72) Inventors: Philippe Baenninger, Epalinges (CH); Youcef Ait Bouziad, Echandens (CH); Heinz Wyss, Oberdiessbach (CH); Jean-Marc Flick, Pomy (CH)

(73) Assignee: Nestec S. A., Vevey (CH)

( * ) Notice: Subject to any disclaimer, the term of this patent is extended or adjusted under 35 U.S.C. 154(b) by 0 days.

(21) Appl. No.: 15/749,710

(22) PCT Filed: Aug. 22, 2016

(86) PCT No.: PCT/EP2016/069784
§ 371 (c)(1),
(2) Date: Feb. 1, 2018

(87) PCT Pub. No.: WO2017/032732
PCT Pub. Date: Mar. 2, 2017

(65) Prior Publication Data
US 2018/0222654 A1    Aug. 9, 2018

(30) Foreign Application Priority Data

Aug. 25, 2015 (EP) .................................... 15182339

(51) Int. Cl.
*A47J 31/00*    (2006.01)
*B65D 75/58*    (2006.01)
(Continued)

(52) U.S. Cl.
CPC .......... *B65D 75/5883* (2013.01); *A47J 31/44* (2013.01); *B65D 85/816* (2013.01); *F16K 3/26* (2013.01);
(Continued)

(58) Field of Classification Search
CPC ..... A47J 31/44; A47J 31/4492; B65D 85/804; B65D 85/816; B65D 75/5883; B67D 1/04; B67D 1/06; B67D 1/0015; B67D 1/0021
(Continued)

(56) References Cited

U.S. PATENT DOCUMENTS

| 4,421,146 A | * | 12/1983 | Bond | ..................... B65D 77/06 |
| | | | | 141/349 |
| 5,121,857 A | * | 6/1992 | Hutchinson | .......... B67D 1/0055 |
| | | | | 222/105 |

(Continued)

FOREIGN PATENT DOCUMENTS

| WO | 2010080707 A1 | 7/2010 |
| WO | 2013036564 A2 | 3/2013 |

OTHER PUBLICATIONS

International Search Report, dated Oct. 25, 2016, in PCT/EP2016/069784, filed Aug. 22, 2016.
(Continued)

*Primary Examiner* — Reginald Alexander
(74) *Attorney, Agent, or Firm* — Dunlap Codding, P.C.

(57) ABSTRACT

A fitment for a package for preparing a beverage connectable to a machine for supplying sanitized liquid to the package is disclosed. The fitment includes a sealing portion and a housing and a fluid connector for fluidly connecting to the machine and to supply liquid inside the container. Also disclosed are packages containing same and methods of producing and using same.

14 Claims, 10 Drawing Sheets

(51) Int. Cl.
*A47J 31/44* (2006.01)
*B65D 85/816* (2006.01)
*F16K 3/26* (2006.01)
*B65D 85/804* (2006.01)
*B67D 1/00* (2006.01)
*B67D 1/04* (2006.01)
*B67D 1/07* (2006.01)
*B67D 1/08* (2006.01)

(52) U.S. Cl.
CPC ............ *F16K 3/265* (2013.01); *B65D 85/804* (2013.01); *B65D 2575/583* (2013.01); *B67D 1/0021* (2013.01); *B67D 1/0078* (2013.01); *B67D 1/0081* (2013.01); *B67D 1/04* (2013.01); *B67D 2001/075* (2013.01); *B67D 2001/0817* (2013.01); *B67D 2210/00013* (2013.01); *B67D 2210/00015* (2013.01)

(58) Field of Classification Search
USPC ................ 99/275, 279, 290, 295, 300, 323; 251/149.1, 291, 353; 141/349, 383; 239/127; 366/136, 137; 222/146.5, 222/146.6, 523, 129.1, 105, 318, 400.7
See application file for complete search history.

(56) References Cited

U.S. PATENT DOCUMENTS

| | | |
|---|---|---|
| 5,449,023 A | 9/1995 | Cleland |
| 5,720,414 A * | 2/1998 | Adams ................ B67D 7/0288 141/100 |
| 9,539,175 B2 * | 1/2017 | Carlsson ............... A61J 1/2093 |
| 2010/0176155 A1 * | 7/2010 | Baron ................. B67D 1/0079 222/129.1 |

OTHER PUBLICATIONS

Written Opinion of the International Searching Authority, dated Oct. 25, 2016, in PCT/EP2016/069784, filed Aug. 22, 2016.

* cited by examiner

FITMENT FOR PACKAGE AND PACKAGE FOR PREPARING A BEVERAGE FROM LIQUID SUPPLIED TO THE PACKAGE BY A DEVICE

CROSS-REFERENCE TO RELATED APPLICATIONS/INCORPORATION BY REFERENCE STATEMENT

This application is a US national stage application filed under 35 USC § 371 of International Application No. PCT/EP2016/069784, filed Aug. 22, 2016; which claims priority to EP App No. 15182339.0, filed Aug. 25, 2015. The entire contents of the above-referenced patent applications are hereby expressly incorporated herein by reference.

TECHNICAL FIELD

The present disclosure relates to an improved fitment for a package and package for preparing a beverage such as a nutritional liquid composition in a safe and hygienic manner. In particular, the package contains nutritional ingredients, such as an infant formula, milk- or soya-based ingredients and connects via the fitment to a device to be supplied with a liquid; the liquid being associated with the nutritional ingredients in the capsule for preparing the beverage, such as a ready-to-drink infant formula composition.

BACKGROUND

Nowadays, machines or systems for preparing nutritional beverages by mixing nutritional ingredients with liquid, usually water, are frequently used for in-home and out-of-home applications and should develop further for feeding patients in hospitals or clinics.

When preparing certain beverages for more fragile persons such as infants, toddlers, patients or seniors, it is important to ensure that the liquid to mix with the product ingredients and supplied by the machine is safe on a microbiological point of view, each time the machine is used. Liquid can contain undesired contaminants such as microorganisms or viruses for example. These undesired contaminants should be removed or neutralized from the liquid before the liquid is mixed with the nutritional ingredients contained in the package.

A particular problem can be called the "last mile". The "last mile" is actually a part of the fluidic line between the sanitizing area in the machine and the mixing or reconstitution point in the package that may not be properly decontaminated or sanitized. Such a portion can be a more or less small portion of surface, a conduit, a needle and the like.

U.S. Pat. No. 6,118,933 relates to an apparatus or method for preparing infant formula from powder with dispensing and filtering means. The apparatus comprises a reservoir for holding a supply of water, a heating element for heating well in advance water at a temperature suitable for being safely fed to a baby, a baby bottle positioned for receiving water dispensed from the reservoir through a spigot and a supply of powdered formula for immediately mixing with water dispensed from the reservoir through the spigot. The apparatus further comprises means for disinfecting including a ultra-violet (UV) lamp disposed within the reservoir or means for filtering the bacteria from the water within the flow path between the pump and the spigot. Such system is not very convenient as it requires the user to dose the right amount of powder in the baby bottle but more importantly, it is not so safe because the spigot itself may be contaminated and vehicle contaminants in the water passing therethrough.

EP2046398 relates to a dispenser for preparing a nutritional composition comprising a reservoir, water heating means and water discharge means wherein a bacterial filter is provided between the water heating means and the water discharge means such that heated water passes the filter prior to discharge from the dispenser. A steam generator is further provided such that the interior of the water discharge means and/or filter surface may be cleaned by the passage of steam during each cycle.

EP2134222 relates to an apparatus for producing a drink, for example milk, configured to prepare the drink concentrate by mixing the amount of formula (P) necessary for the total amount of drink in a certain amount of hot liquid having a temperature in the range of 60-80° C., and to add the right amount of liquid of a certain low temperature to the concentrate in order to reach the end volume of the drink at safe drinking temperature. The apparatus further comprises a radiation system comprising an UV-lamp and a UV-transparent tube such that during operation the tube contains the lamp flowing around, or the liquid flows through a tube with the UV-radiation coming from the outside.

WO 2009/027131 relates to a dispensing device for preparing and dispensing nutritional composition from a capsule containing nutritional ingredients comprising a water circuit, a water heater, an injection head comprising intruding part for injecting water in the capsule comprising the ingredients; a capsule holder for holding the capsule during injection of water in the capsule, wherein it comprises cleaning and/or sanitizing means arranged to inject a cleaning agent in at least a portion of the water circuit and through the injection intruding part, and collecting means which can be associated in engagement with the injection head for enabling the collecting means to collect and discard the cleaning agent after it has passed through the injection intruding part.

WO2009/092629 relates to a capsule for nutritional beverage with an integrated antimicrobial filter.

EP2236437 relates to a capsule for a nutritional beverage with an antimicrobial filter and furthermore a flow collection member placed downstream of the filter to collect the filtered liquid and for producing a jet of liquid at high velocity in the compartment containing the ingredients.

WO2010/128028, WO2010/128031, WO2010/128051 relate to a capsule with an integrated antimicrobial filter unit further comprising an air inlet and conduit for enabling residual liquid to be removed from the capsule to ensure emptying of the capsule and a full dispensed feed.

The problem of the capsules with integrated filter lies in the complexity of the capsule and the filter material cost and production cost which are very high.

Therefore, there is a need for simpler, lower cost fitment and package connectable to a dedicated beverage preparation device which is safe for preparing a beverage, in particular, by solving the "last mile" problem and having only cleansed/sanitized liquid supplied to the package each time a beverage is prepared.

DETAILED DESCRIPTION

Figure 1:
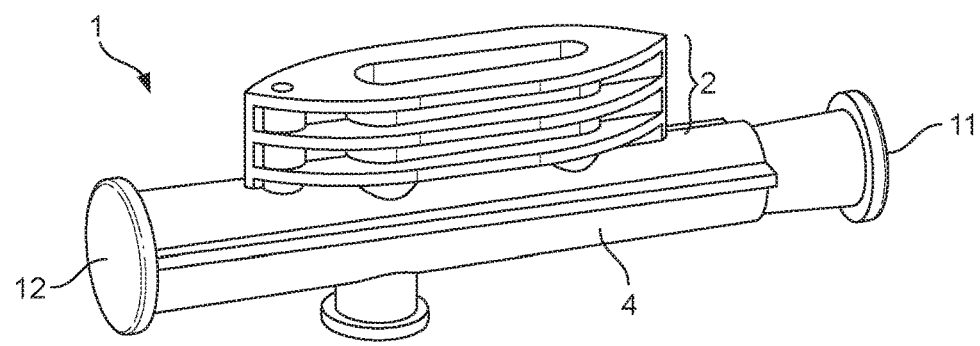
FIG. 1 is perspective view of the fitment of the present disclosure according to a first embodiment.
Figure 2:
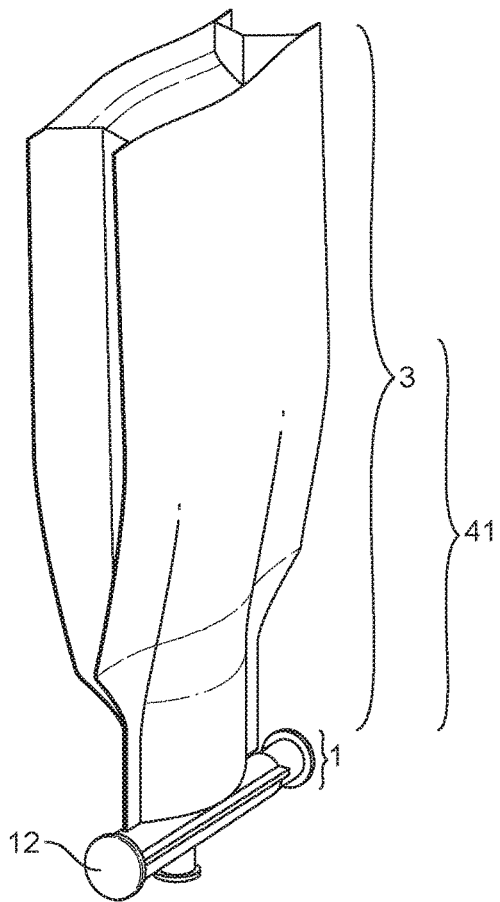
FIG. 2 represents a package comprising a fitment of FIG. 1.
Figure 3:
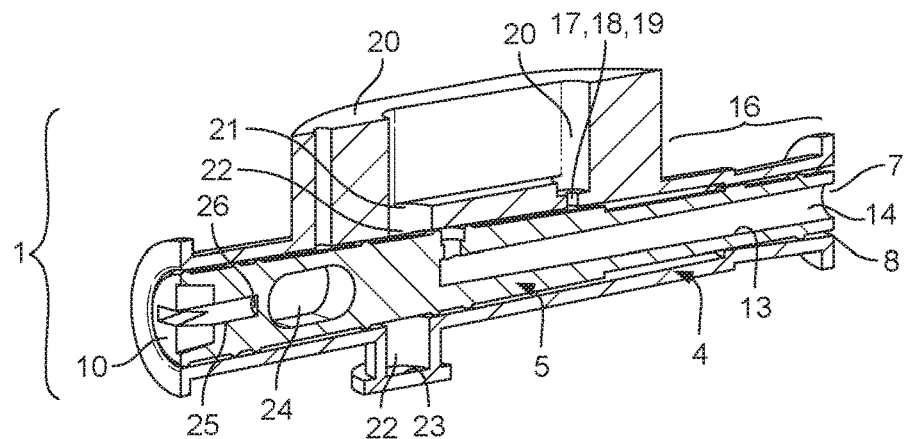
FIG. 3 is a perspective longitudinal cross-section view of the fitment of FIG. 1.

The present disclosure provides a solution to the need(s) and alleviates the mentioned problem(s).

In particular, the present disclosure relates to a fitment for package for preparing a beverage connectable to a machine for supplying sanitized liquid to the package, wherein the fitment comprises:
a sealing portion for sealing to a container,
a housing and a fluid connector for fluidly connecting to a treatment unit of the machine and to supply liquid inside the container;

wherein the fluid connector is arranged in the housing to be displaceable between a storage position in which the connector is enclosed in the housing and a treatment position in which at least a frontal portion of the connector including its tip with a liquid inlet extends beyond the housing, such as (but not limited to) outside the fitment. In particular, the frontal portion of the connector extends a certain distance beyond the housing for enabling at least the tip of the connector to be inserted in the liquid supply and treatment unit and to be exposed to an optical sanitizing field inside the unit.

Therefore, the fitment of the present disclosure is designed to cooperate directly in a moveable/deployable manner with the liquid supply and treatment unit of the machine so that only cleansed/sanitized liquid enters the capsule and the risk of contamination is prevented. The fitment forms the disposable (single-use) interface with the machine and provides freedom for any possible simple and low cost ingredients' container such as a pouch.

In certain non-limiting embodiments, the fluid connector is sealingly arranged inside the housing in aseptically stored condition. By "aseptically stored condition" it is meant that the fluid connector and the interior of the housing are essentially free of microorganisms. Such condition is obtained by appropriate aseptic operation(s), including treatment, assembling and filling, such as by use of oxygen peroxide, UV radiation, alcohol, heat or steam, aseptic gas flowing/flushing, and combinations thereof.

In certain non-limiting embodiments, the fluid connector is arranged in the housing to be slidably moveable between the storage position and the treatment position. In other words, the fluid connector is mounted in telescopic manner relative to the housing. One advantage is that the fluid connector can be hygienically protected from contaminants in the package before the first use and be extended for connection, when required, with the device. This telescopic configuration also provides the advantage that the package size can remain compact.

In certain non-limiting embodiments, the housing is configured as a guiding tube for housing the connector, with a front end opening for enabling the frontal portion of the connector to extend beyond the housing in the treatment position and a rear end opening forming a passage to a pusher of the machine for enabling the pusher to move the fluid connector into the treatment position. Additionally, each of the front end opening and the rear end opening is sealed by a breakable, tearable or removable sealing part, such as (but not limited to) a membrane. The advantage is that the fluid connector remains well protected in the housing but easily and simply actuatable for connection to the machine.

In certain non-limiting embodiments, the connector is arranged in the housing such as when it is moved to the treatment position, a flow path is created between the connector and the product compartment, via the housing, that also corresponds to a liquid dispensing position.

In particular, the fluid connector may comprise a portion of needle comprising a longitudinal liquid conduit extending axially along the portion of needle from a liquid inlet at its tip to at least one liquid outlet. In certain non-limiting embodiments, the liquid outlet extends and/or is positioned transversally to the axial conduit. The liquid outlet may be positioned, for example, at a base portion of the fluid connector. Annular seal members may be provided between the fluid connector and the housing on each side of the liquid outlet so that no liquid can leak out of the housing. In certain non-limiting embodiments, the housing comprises an elongated portion of nozzle protruding from the sealing portion and enclosing the portion of needle of the connector including its tip.

The frontal portion of the fluid connector, for example (but not by way of limitation) corresponding to the portion of needle, including its tip is extendable beyond the housing in treatment position of a length of at least 5 mm, such as (but not limited to) between 8 and 20 mm. In certain non-limiting embodiments, the base portion comprises an enlarged diameter forming an abutment with the housing in the extended position of treatment of the connector. In certain non-limiting embodiments, the liquid outlet is also positioned to match with a second liquid inlet and/or conduit in the housing communicating with the product compartment when the connector is moved towards or into the treatment position.

The advantage of this configuration is that the fluid connector is positionable in a well-defined position for liquid to be properly guided from the tip of the fluid connector where liquid first enters the capsule to the product compartment.

In certain non-limiting embodiments, the liquid outlet is positioned to match, when the fluid connector is moved towards or into the treatment position, with a second liquid inlet in the housing communicating with a liquid conduit and a liquid outlet formed on a compartmenting surface of the fitment intended to define a part of the product compartment of the container.

In a particular (but non-limiting) mode, the sealing portion forms a boat-shaped portion. The boat-shaped portion can taper on both sides in the longitudinal direction of the housing or, alternatively, orthogonally to such direction. The compartmenting surface thereby forms the top surface of this portion. This configuration facilitates the attachment of the container, such as by welding, to form the package.

The liquid conduit is arranged substantially perpendicular or transversal to the direction of extension of the fluid connector. In certain non-limiting embodiments, the beverage traversing conduit and liquid outlet of the connector are longitudinally distant one another and also angularly distant one another, such as (but not limited to) of a 90-degree angle. The opening or closing of the flow paths thus depends essentially on the relative rotational and longitudinal position of the fluid connector relative to the housing. One advantage of such mode is that the liquid flow path and the beverage flow path is controlled by fewer pieces and where the fluid connector plays a central role. Another advantage is the easy switchover of flow paths by simple actuation means of the machine.

The connector further comprises an air inlet, an air conduit and an air outlet; wherein the air outlet is arranged to match with an air inlet of the housing communicating via an air conduit to an air outlet at the compartmenting surface of the fitment. In certain non-limiting embodiments, the air inlet is arranged along the axial direction (A) at the distal end of the connector. In certain non-limiting embodiments, the air outlet of the connector is also arranged along the same angular direction (R) as the through-opening. These means enables to fill pressurized air in the container to empty it completely from liquid. An advantage also comes from the integration of an openable air flow path to the fluid connector and housing. The fitment is therefore simplified with fewer pieces. Furthermore, the machine is simplified as well because only one actuation member (e.g. a pusher) is necessary to move the connector for the changeover in liquid dispensing mode or air dispensing mode.

The fluid connector may further comprise at least one annular sealing member positioned next to the tip for ensuring a liquid-tight fitting of the fluid connector against a complementary annular surface of a bushing of the liquid supply and treatment unit.

In any possible modes, the fluid connector comprises a filtering means to filter liquid.

The present disclosure further relates to a package which comprises a container, such as a sachet or pack, sealed to the sealing portion of the fitment to delimit with it at least one product compartment containing nutritional ingredient(s) for the production of a beverage upon supply of liquid inside the compartment.

The appended drawings are given as a matter of non-exhaustive illustration of a particular (but non-limiting) embodiment.

The fitment 1 of the present disclosure is described in relation to FIGS. 1 to 7 according to a first embodiment. The fitment generally comprises a sealing portion 2 for sealing to a container 3 to form a package 4. The sealing portion can be a boat-type fitment portion or any equivalent. The container can be a doypack or any equivalent. The container generally comprises beverage ingredients, such as infant formula powder or milk powder or any other ingredients such as soya, cocoa, proteins, fruit, vegetable, in powder, paste and/or liquid format.

Figure 11:
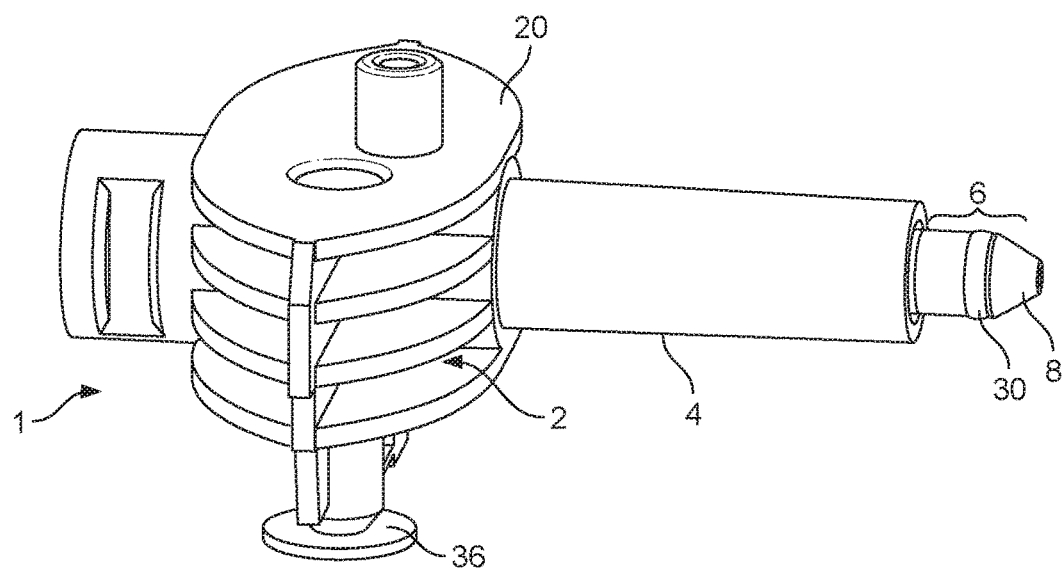
FIG. 11 is a perspective view of the fitment of FIG. 8 when the fluid connector is in extended position for insertion through the machine and liquid supply in the package.
Figure 12:
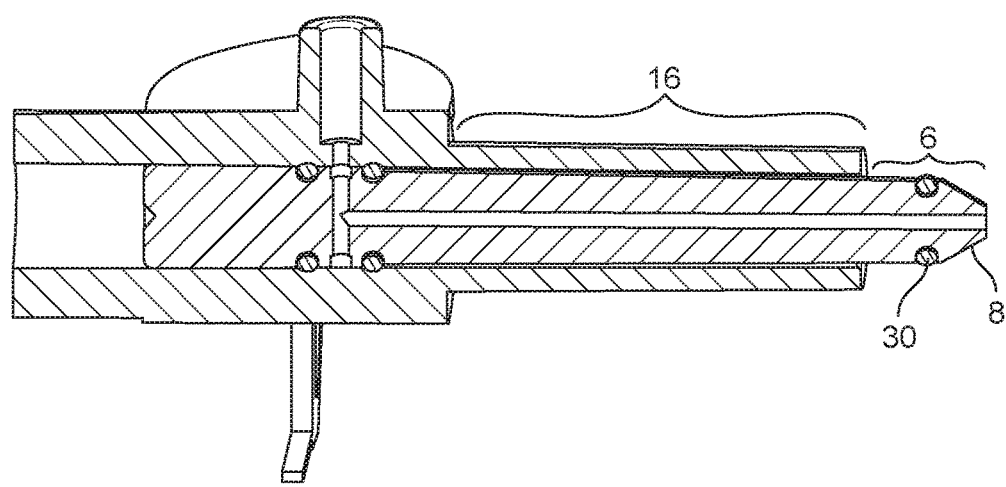
FIG. 12 is a longitudinal cross-section view of the fitment in the position of FIG. 11.
Figure 18:
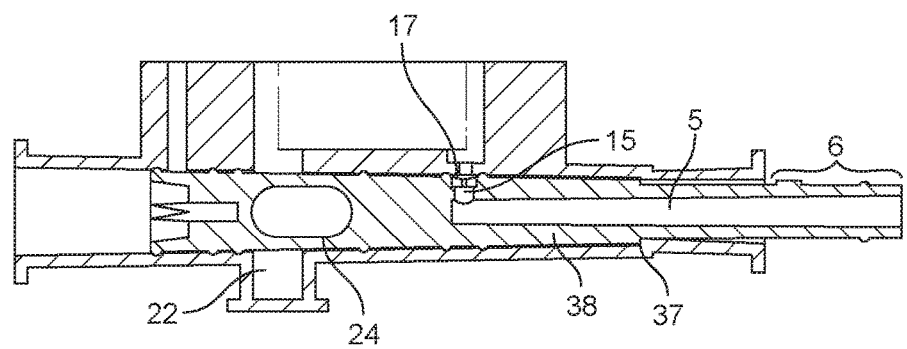
FIG. 18 is an enlarged cross section view of the fitment in the position of insertion of FIG. 17.

The fitment comprises a housing 4 and a fluid connector 5 arranged one another to fluidly connect the fitment (and so the package too) to a beverage preparation machine for supply of liquid inside the container. In general, the fluid connector is displaceable inside the housing from a storage position in which the fluid connector is sealingly enclosed in the housing to an insertion position in which a frontal portion of the fluid connector extends beyond the housing. The fitment represented in FIGS. 1 to 5 corresponds to the storage position before use. The longest extension represented by the frontal portion 6 of the fluid connector is illustrated in FIGS. 11, 12 and 18 and corresponds to the position of insertion of the fluid connector through the machine for irradiation treatment by UV as will be explained later on in detail. In certain non-limiting embodiments, the frontal portion 6 is extendable beyond the housing a sufficient distance to properly insert in the machine for connection and proper UV treatment. Its length of extension may be of at least 5 mm, such as (but not limited to) comprised between 8 and 20 mm.

The housing 4 is configured as a guiding tube for housing the fluid connector and comprises a front end opening 7 at the front or tip 8 of the connector and a rear end opening 9 at the opposite side of the tube. The rear end opening forms a passage for a pusher to push the distal end 10 of the connector towards the interior of the housing. Both front and rear end openings 7, 9 are sealingly closed by breakable, tearable or removable sealing parts 11, 12. These parts can be membranes such as thin aluminium discs welded on the edges of the openings. In certain non-limiting embodiments, the fluid connector is stored in the housing in aseptic condition.

The fluid connector, more particularly its frontal portion 6, is covered by an elongated portion of nozzle 16. The portion of nozzle protrudes from the sealing portion 2 to make the fitment relatively thin to enable sufficient insertion and holding in the machine.

In certain non-limiting embodiments, the fluid connector comprises a portion of needle with a longitudinal conduit 13 for liquid which extends axially along the portion of needle from a liquid inlet 14 at the tip 8 to at least one liquid outlet

Figure 4:
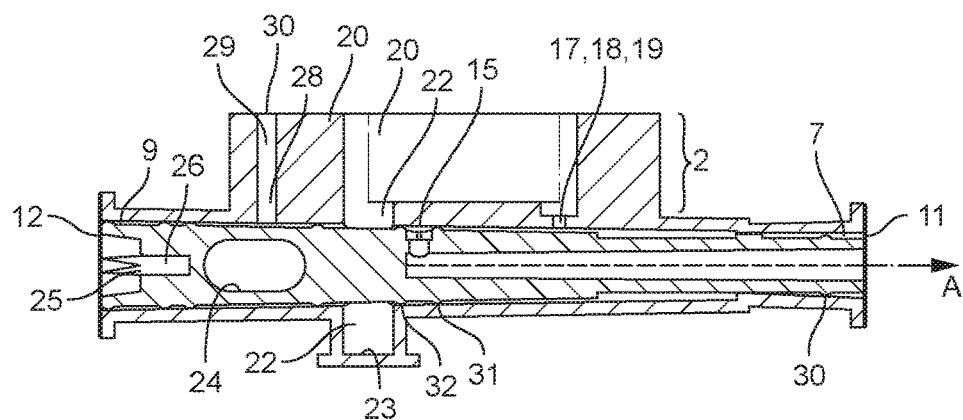
FIG. 4 is a plane longitudinal cross-section view of the fitment of FIG. 1.
Figure 5:
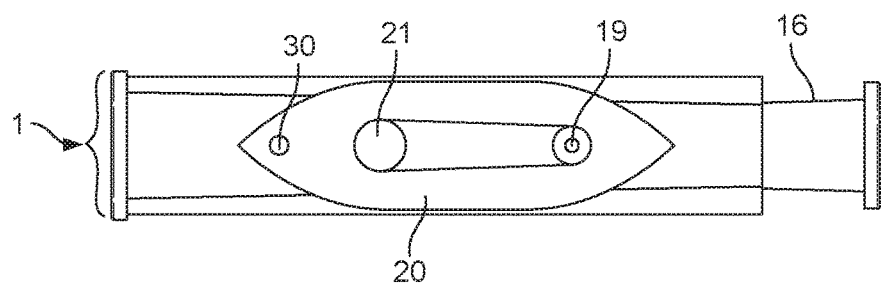
FIG. 5 is a top view of the fitment of FIG. 1.

15. In certain non-limiting embodiments, the liquid outlet 15 extends transversally to the longitudinal conduit 13. The housing comprises a second liquid inlet 17, a liquid conduit 18 and a liquid outlet 19. The liquid outlet 19 merges with a compartmenting surface 20 of the fitment which delimits with the surfaces of the container at least one compartment of the package. The second liquid inlet 17 is longitudinally arranged at distance from the liquid outlet 15 of the fluid connector in the stored or rest position of the fitment (FIG. 4). In certain non-limiting embodiments, the liquid outlet 19 of the housing is of reduced diameter so as to provide a high velocity jet of liquid inside the container. The fluid connection between the liquid outlet 15 and the liquid outlet 17 is obtained by longitudinal displacement of the fluid connector along the direction of insertion (frontal direction A in FIG. 4).

Furthermore, the fitment comprises a beverage delivery inlet 21, a beverage delivery conduit 22 and a beverage delivery outlet 23. The fluid connector is arranged to be rotatable in the housing and comprises a beverage traversing conduit 24 which can match with the beverage delivering conduit 22 of the housing in a particular rotated position. For the traversing conduit 24 to match with the beverage delivery conduit 22, it may also necessary that the fluid connector is displaced or slided longitudinally (translated) in insertion position through the machine. The beverage traversing conduit 24 and liquid outlet 15 of the fluid connector are longitudinally and also angularly distant one another. In a particular (but non-limiting) embodiment, the angular distance is of a 90-degree angle or a quarter turn. This configuration enables to maintain the fitment closed for delivery of the beverage when liquid is supplied in the package. The liquid outlet 15 may further extend by a portion of channel extending circumferentially along a portion of angle at the surface of the connector as visible on FIG. 6. In certain non-limiting embodiments, the length of this portion of channel is of 90-degree angle. This portion of channel enables to supply liquid in the package while maintaining the package open for beverage delivery. However, other configurations are possible and the liquid outlet 15 could be angularly aligned with the traversing conduit 24 on the surface of the fluid connector; in which case the liquid flow path and beverage flow path are opened and closed simultaneously.

The fluid connector may further comprise an air inlet 25, an air conduit 26 and an air outlet 27. The housing also comprises an air inlet 28 leading via an optional air conduit 29 to an air outlet 30. It should be noted that the term "air" in the present application could also means another gas than air such as carbon dioxide.

In certain non-limiting embodiments, the traversing beverage conduit 24 of the connector is also a through-opening of oblong shape to enable the opening of both pressurized air path and beverage dispensing flow path simultaneously. The present configuration enables to simplify the structure of the fitment. However, it would be also possible to have air and beverage conduits which are opened sequentially.

In certain non-limiting embodiments, the air inlet 25 of the fluid connector is arranged along the axial direction at the distal end 10 of the connector. The advantage as will be discussed later is about the easier feeding of pressurized air by the machine.

Figure 6:
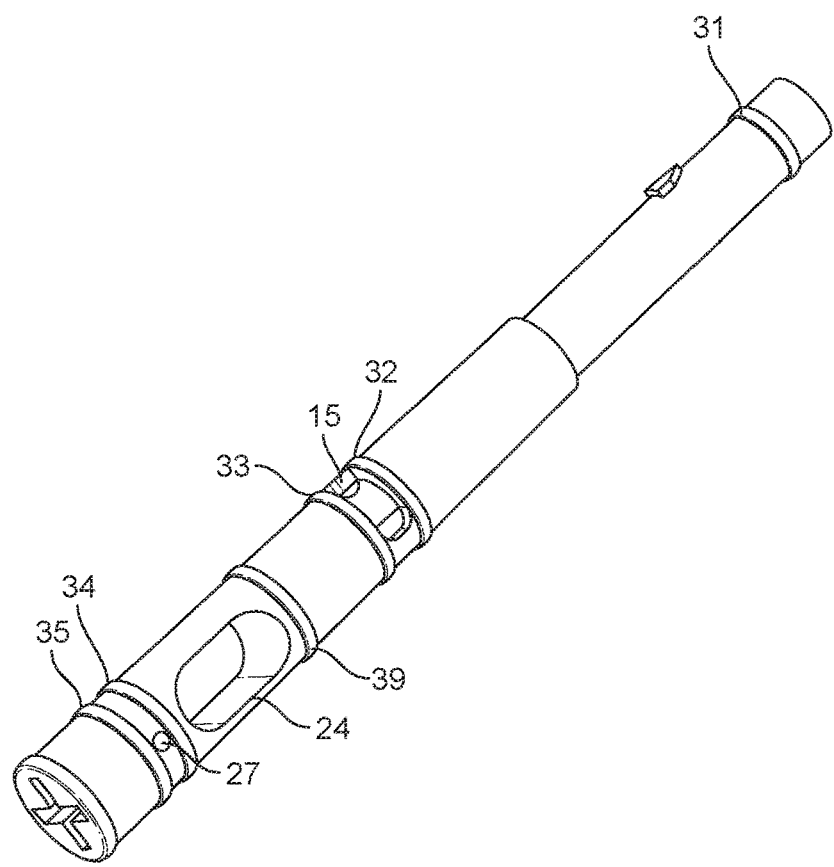
FIG. 6 is perspective view of the fluid connector of the fitment of FIG. 1.
Figure 7:
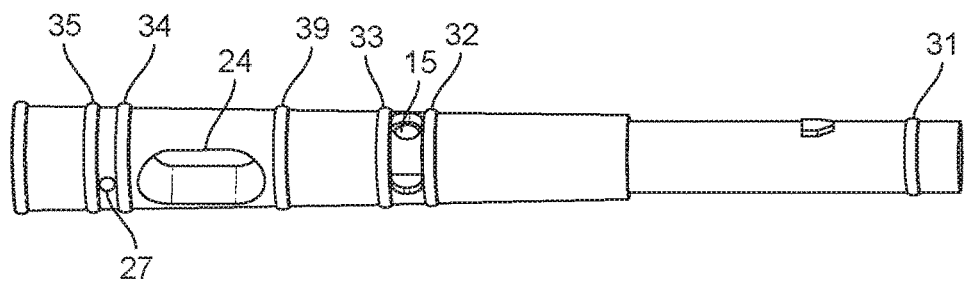
FIG. 7 is a side view of the fluid connector of FIG. 6.

As illustrated in FIGS. 6 and 7, several sealing members can be provided on the surface of the connector to ensure fluid tightness between the connector and the machine and/or between the connector and the housing. In particular, in certain non-limiting embodiments, a first annular sealing member 31 is positioned next to the tip 8 of the fluid connector. This sealing member is effective for providing a liquid tight engagement of the connector and the machine as discussed later. Additional annular sealing members 32, 33 can be placed on each side of liquid outlet 15 to prevent any by-pass to the beverage outlet and also no leak outside of the fitment. Furthermore, additional sealing members 34, 35 are annularly positioned on each side of the air outlet 27. Finally, the traversing opening may also be sealed by sealing members 34, 39 annularly positioned on each side.

Figure 8:
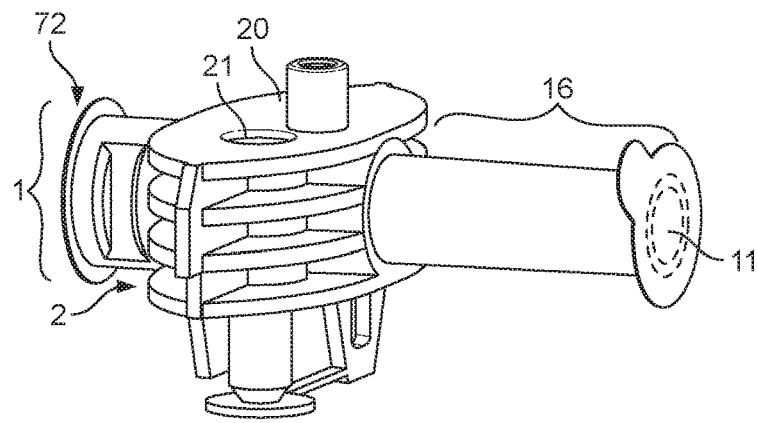
FIG. 8 is perspective view of the fitment of the present disclosure according to a second embodiment.
Figure 9:
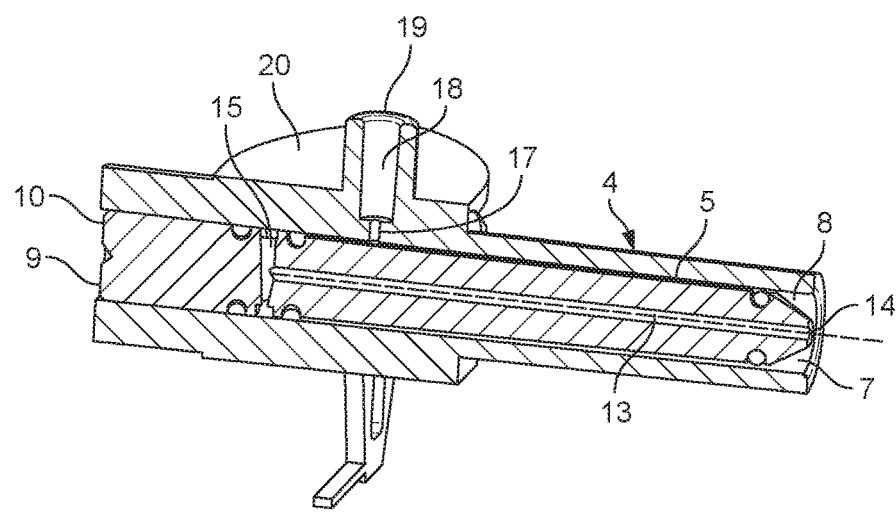
FIG. 9 is perspective longitudinal cross-section view of the fitment of FIG. 8.
Figure 10:
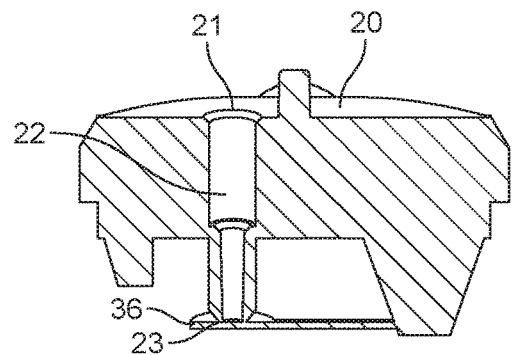
FIG. 10 is a perspective transversal cross-section view of the fitment of FIG. 8.

FIGS. 8 and 9 show another possible embodiment of the fitment. The same numeral references are used for designating the same means and only the differences compared to the previous embodiment are here described. The fitment 1 may comprise a sealing portion 2 forming a boat-type portion oriented transversally to the direction of extension of the housing 4 and connector 5. This orientation enables to provide two separated flow paths respectively a liquid flow path traversing the connector through liquid conduit 13, and a beverage flow path with separate beverage inlet 21, conduit 22 and outlet 23. In such configuration, the beverage flow path is not closed while the liquid flow path is opened. In particular, the fluid connector 5 is slidably movable in the housing 4 between a stored position of the connector (FIG. 9) and an insertion and liquid supply position (FIG. 12) in which a liquid outlet 15 of the fluid connector transversally matches the second liquid inlet 17 of the housing. The beverage outlet 23 can be opened by removing an end cap 36 such as by cutting or tearing. Another simplification is that no pressurized air flow system is present. Of course, one could be added to the fitment.

Figure 13:
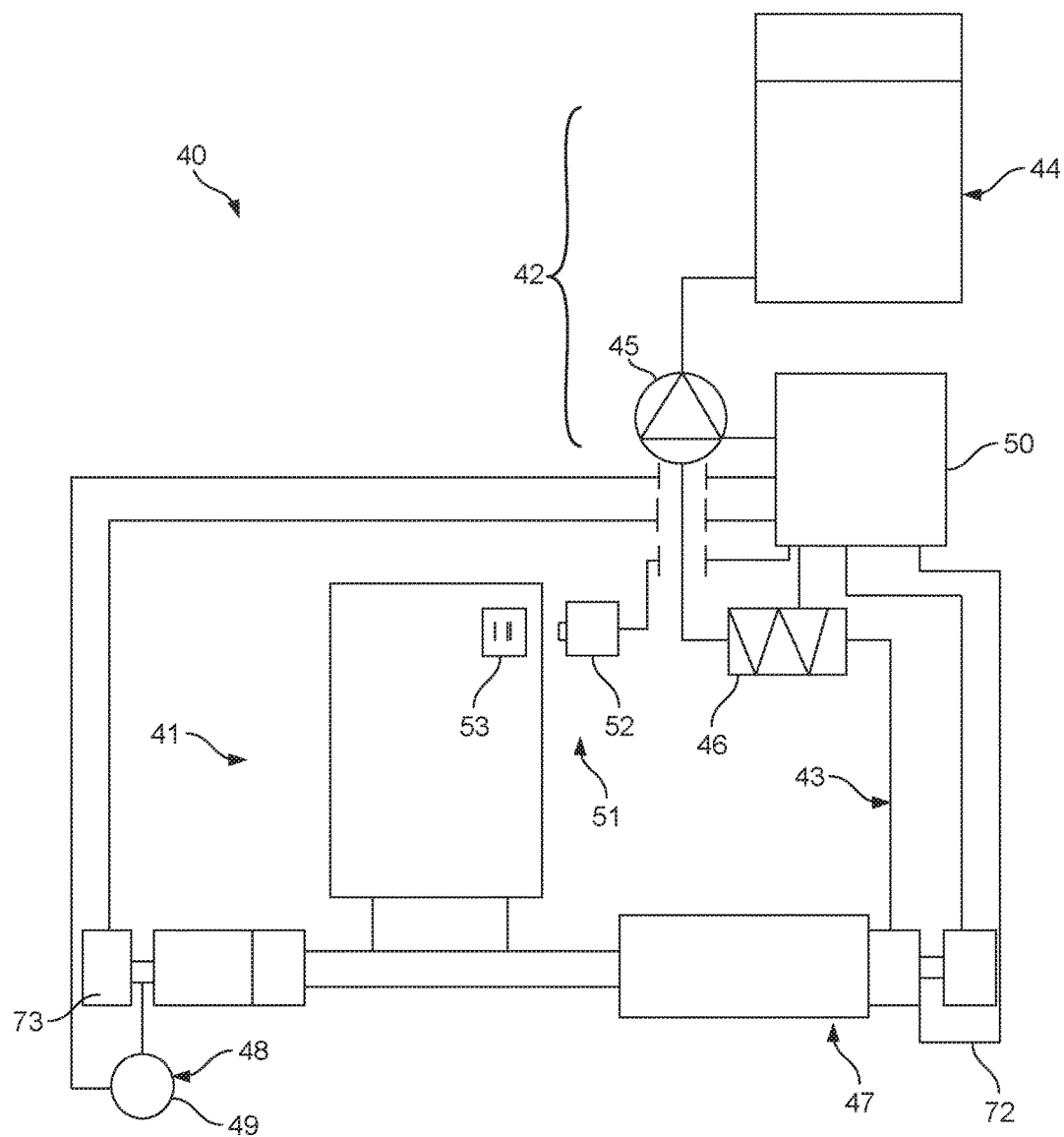
FIG. 13 represents a schematic view of a mode of an apparatus comprising a package and a beverage preparation machine of the present disclosure.

Now a general presentation of the apparatus is visible on FIG. 13. The apparatus 40 is designed to prepare a beverage, such as infant formula liquid, by delivering cleansed or sanitized liquid within the package 41 containing nutritional ingredients such as infant formula or milk powder. The apparatus generally comprises a machine 42. The package and machine 41, 42 are connectable together to allow the machine to controllably supply liquid in the package, at controlled temperature and volume; such liquid mixing with the nutritional ingredients to prepare the beverage. Liquid is generally water but could be another liquid solvent. The beverage is then dispensed from the package 41 into a recipient such as a baby bottle (not represented). Dispensing of the beverage may be produced by opening the package such as under the effect of pressure inside the package or through a filter in the bottom of the package.

The machine generally comprises a liquid circuit 43 comprising a liquid reservoir 44 connected to a pump 45 and a liquid heater 46. The liquid circuit supplies liquid at controlled temperature to a liquid supply and treatment unit 47. The machine may further comprise a (optional) pressurized air circuit 48 with an air pump 49 or any other controllable air supply such as a compressed air reservoir (e.g., air cartridge) and a controllable valve. A control unit 50 is also provided to control all these active elements of the machine as will be described later. The apparatus may also optionally comprise a package recognition system 51 having a code recognition device 52 as part of the machine and a code 53 arranged on package. The system can provide data input to the control unit to adjust output to operate specifically certain elements of the machine. The code can be a barcode for example and the code recognition device can be an infrared reader or similar.

Figure 14:
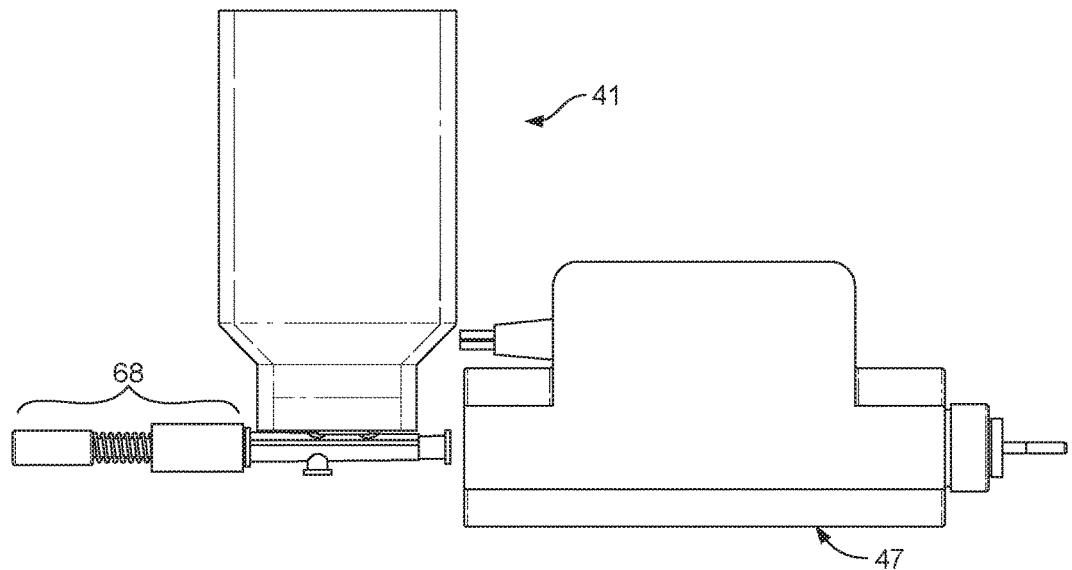
FIG. 14 represents a partial view of the apparatus of FIG. 8 during connection of a package to the supply and treatment unit of the machine.
Figure 15:
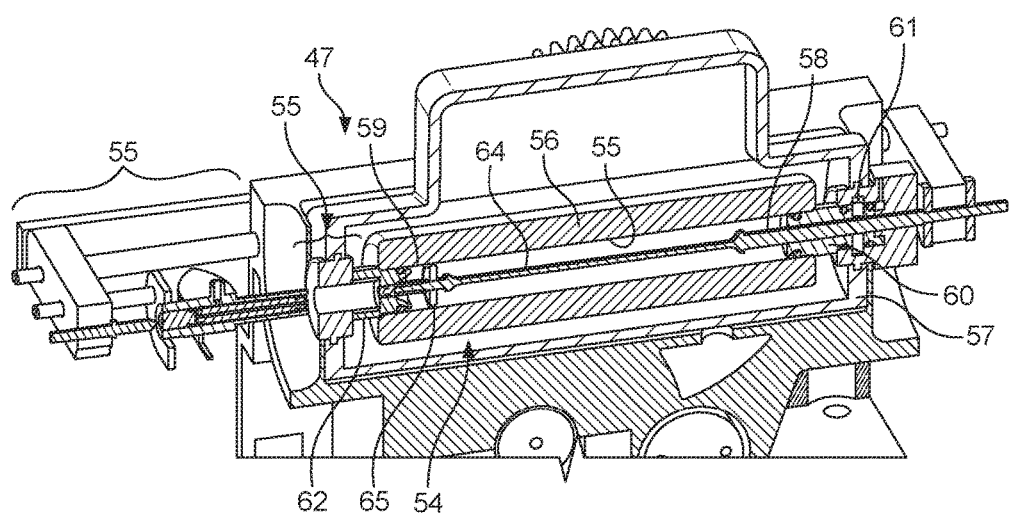
FIG. 15 is a cross section view of the apparatus during connection of a package with the fitment of the second embodiment of FIGS. 8 and 9.
Figure 16:
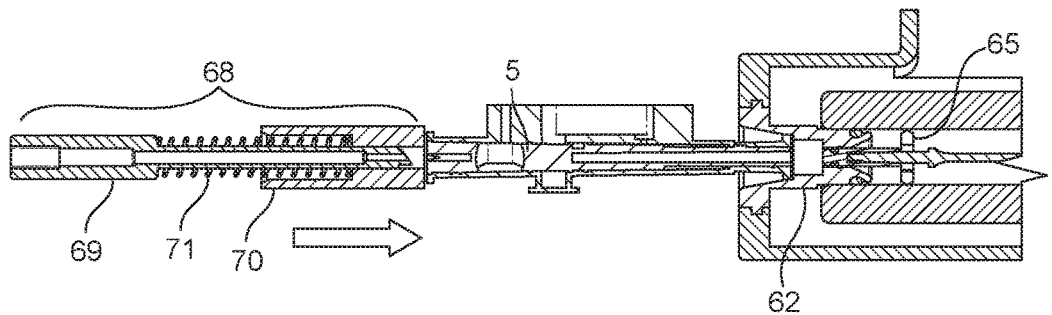
FIG. 16 is a detail longitudinal cross section view of the fitment and part of the machine during connection of the package with the valve still closing the liquid supply and treatment unit.

FIGS. 14 to 16 focus on the similar connection of the package 41 with the liquid supply and treatment unit 47 for the first and second embodiments respectively. The liquid supply treatment unit 47 generally comprises an optical irradiation chamber 54 configured for cleansing/sanitizing liquid passing or circulating therein and a connection assembly 55 for fluidly connecting the liquid supply and treatment unit with the package 41.

The optical irradiation chamber 54 generally comprises a tube 55 for guiding liquid and an irradiating member 56. In certain non-limiting embodiments, the irradiating member is at least one lamp delivering ultraviolet light (UV) towards the interior of the tube. The UV emission is controlled by the control unit to be effective for sanitizing liquid circulating in the tube. The tube is transparent to UV and may be constituted as a part separate of the irradiated member or an integrated wall thereof. On the outside, the optical irradiation chamber 54 may comprise a protective casing 57 which is opaque to the radiation.

As an example, the optical irradiation chamber can use discharge plasma technology. The UV lamp contains a gas such as xenon for the generation of an electromagnetic wave that emits UV in the range of 260 to 280 nm. This lamp provides advantages compared to standard UV lamp as it is more compact, instantaneously efficient and shows high UV efficiency and microbial inactivation rate compared to standard (mercury) UV lamp thanks to the generated pulses and spectral difference in the UV output. However, other UV irradiation technology could be used as possible alternatives such as UV LEDs.

The optical irradiation chamber 54 further comprises an inlet end 58 for liquid to enter the chamber and an outlet end 59 for liquid to exit the chamber. At the inlet end, a (inlet) bushing 60 may be provided with liquid inlet(s) 61 connected to the liquid circuit 43. On the outlet end 59 of the tube, a (outlet) bushing 62 is provided with a flow passage for direct connection of the package as described later. In certain non-limiting embodiments, the bushing 62 is made of a material that reflects UV radiation such as stainless steel or similar material. The bushing 62 may also advantageously serve as an electrode for measuring the conductivity of liquid and so controlling if the tube is properly filled with liquid. In certain non-limiting embodiments, the chamber 54 comprises a valve 63 which is provided to fluidly close the bushing 62. The valve can be actively controlled by the control unit for closing and opening the tube. In particular, in certain non-limiting embodiments, the bushing is connected to an activation rod 64 which can be advantageously a movable ground electrode of the discharge plasma UV lamp. The rod or electrode may be connected at its rear or external part to a motor 72 (FIG. 13) that can move the valve reciprocally in at least two positions; a closing position where the valve sealingly engages the bushing in closure of its flow passage and an open position where the valve is moved away (i.e. retracted) from the bushing. In FIG. 15, the bushing is closed by the valve and so is the irradiation chamber. In such configuration, the irradiation chamber can be irradiating liquid contained in the tube or be switched off.

The irradiation chamber 56 may further comprise a flow homogenizer 65 within the tube 55 to avoid a stratification of the fluid passing through the chamber. For example, the flow homogenizer may be a screen disk mounted on the central ground electrode 64.

In FIG. 16, the fitment is positioned in reference position relative to the liquid supply and treatment unit such as by a part of the fitment engaged therein. The fluid connector remains in stored position. The valve 63 maintains the chamber closed and liquid inside the chamber can be irradiated by UV for sanitizing pre-treatment during a period of time (e.g. 3-10 seconds).

Figure 17:
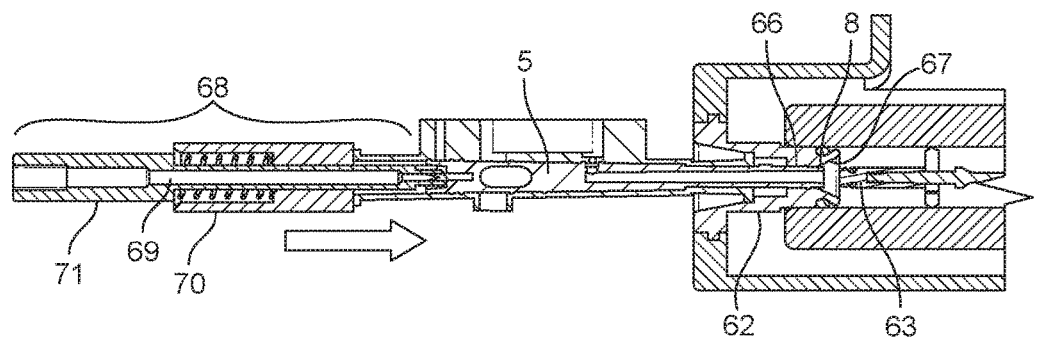
FIG. 17 is a longitudinal cross section view of the fitment and part of the machine after insertion of the fluid connector through the liquid supply and treatment unit of the machine and the valve being opened ("treatment or insertion position").

FIGS. 17 and 18 show the package and its fitment connected to the liquid supply and treatment unit 47 with the fluid connector 5 displaced into an inserted position through the bushing 62 and its tip 8, as well as the liquid inlet, being exposed to the UV irradiation field in the tube. In such position of insertion, the free end of the valve can be fully decontaminated. The UV lamp should also be activated before the opening and the pump should remain inactivated (or "off") for about 1 second to avoid the fluid to flow immediately in the packaging. The fluid homogenizer 65 also creates a lot of turbulences at this place which makes the liquid to reside a longer time and allow the cleaning of the end tip of the valve when the pump is activated.

In certain non-limiting embodiments, the bushing 62 comprises at least one annular sealing surface portion 66 that is arranged to snugly fit to a complementary sealing surface portion of the fluid connector for providing a liquid-tight sealing engagement of the fluid connector when inserted. The bushing further comprises a flared surface portion 67 that extends from the sealing surface portion 66 towards the inside of the optical irradiation chamber or tube. This flared shape of the surface portion enables to reflect and diffract the UV rays and maximize the exposure of the valve 63 and tip of the connector.

Figure 19:
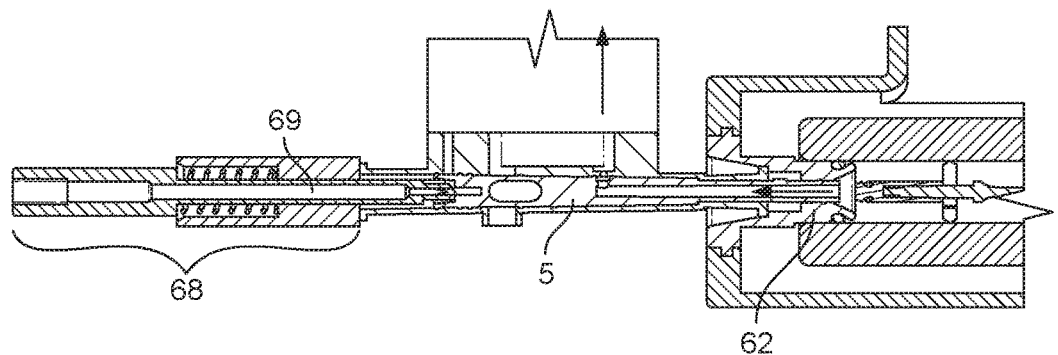
FIG. 19 is detail longitudinal cross-section view of the fitment and part of the machine during liquid dispensing from the machine into the package via the fitment.

In FIG. 19, is illustrated the liquid dispensing mode. The fluid connector remains inserted through the bushing with, in certain non-limiting embodiments, its tip 8 being still exposed to the UV radiation emitted by the irradiation member. In certain non-limiting embodiments, the fluid connector is in the same position relative to the housing than in the treatment position of FIGS. 17 and 18. The fluid connector comprises a frontal portion of needle that actually defines a length of the fluid connector extending telescopically beyond the housing. An abutment 37 can be provided to determine the position of the fluid connector in extension. The abutment can be, for example, an annular edge of a base portion 38 of larger diameter than the diameter of the forward needle portion as shown in FIG. 18.

When the fluid connector 5 is in the liquid dispensing position, the liquid outlet 15 matches with a second liquid inlet 17 of the housing. Such liquid inlet communicates with the product compartment, as described earlier, for supplying sanitized liquid in the container 3. The beverage flow path remains closed by the side wall of the traversing opening closing the beverage delivery conduit of the housing. This mode can ensure a complete filling of the treated liquid in the package and can insure an improved dissolution of the ingredients in the container.

Possibly, the fluid connector comprises a filtering means to filter liquid (not illustrated). The filter may be a filter for filtering contaminants and/or solid particles contained in liquid.

Figure 20:
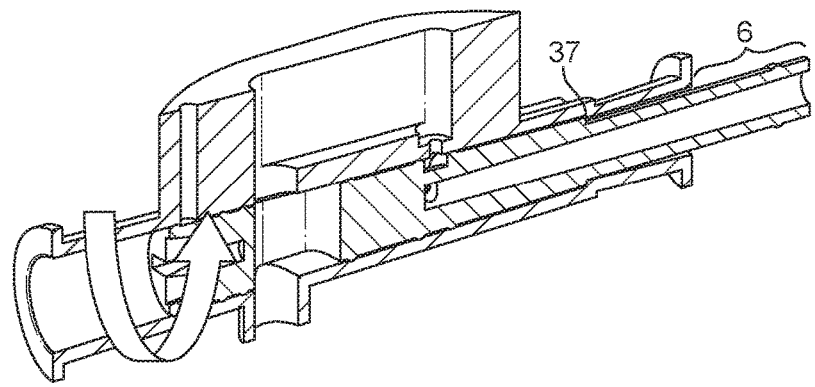
FIG. 20 is a perspective cross sectional view of the fitment when configured for beverage dispensing.
Figure 21:
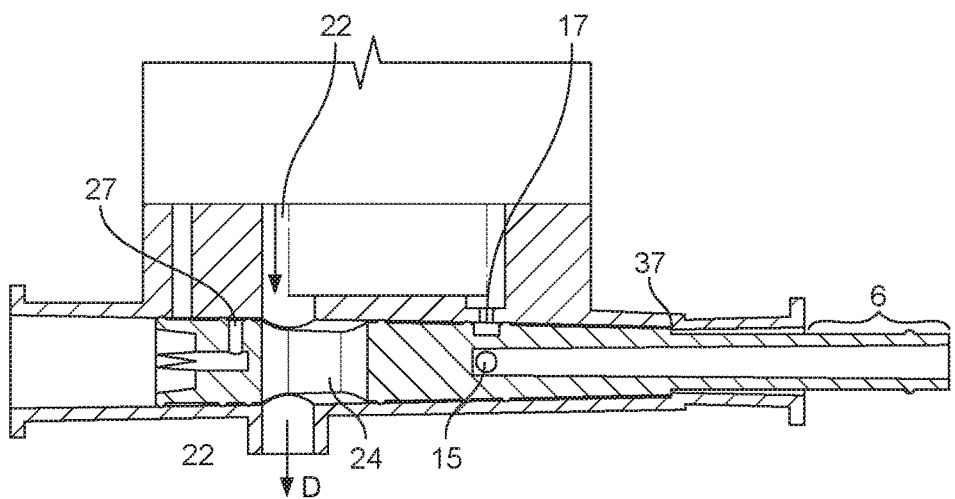
FIG. 21 is a partial cross-section view of the package when configured for beverage dispensing.

In certain non-limiting embodiments, when the container is filled with sanitized water, the beverage delivery flow path is opened in FIGS. 20 and 21. The fluid connector is moved rotationally to the beverage dispensing mode. The changeover from the liquid supply mode to the beverage dispensing mode is obtained by rotating the fluid connector of a quarter turn such as by action of the actuating mechanism (controlled by the control unit). As a result, the liquid outlet 15 and inlet 17 become separated by the portion of channel extending circumferentially thereby maintaining the liquid supply open. The beverage traversing conduit 24 and beverage delivery inlet 21, delivery conduit 22 get aligned for enabling beverage to be dispensed (e.g. direction D). In the beverage delivery mode, the UV irradiation in the chamber is carried on for sanitizing liquid circulating through the unit and supplied in the package.

Figure 22:
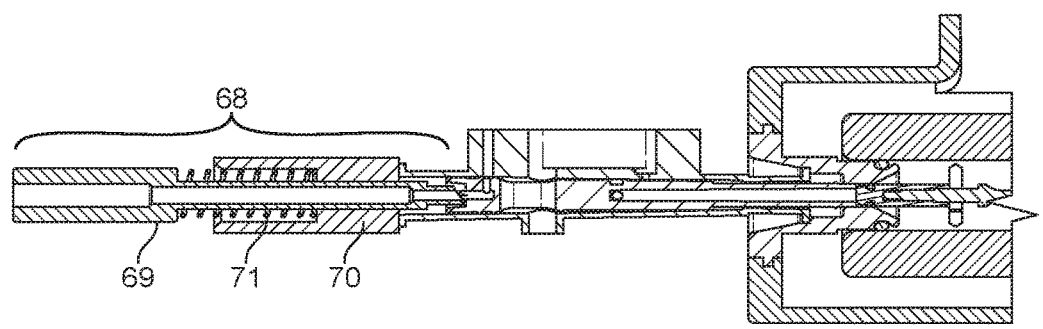
FIG. 22 is longitudinal cross-section view of the fitment and part of the machine during pressurized air introduction in the package.
Figure 23:
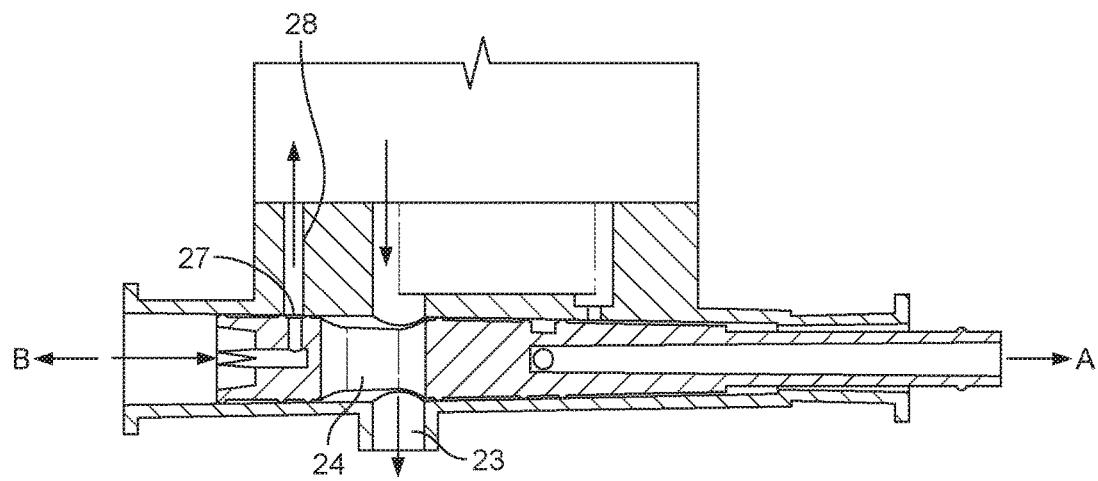
FIG. 23 is an enlarged cross-section view of the fitment during pressurized air introduction in the package.

In the next (optional) operation of the apparatus illustrated in FIGS. 22 and 23, the pressurized air flow path is connected in the fitment. The fluid connector is thereby further moved a predetermined distance in pure translation backwards (in direction B opposite to direction A) while keeping the angular position of beverage traversing conduit 24. As a result, the air outlet 27 of the connector becomes aligned with the air inlet 28 of the housing. Simultaneously, due to the oblong form of the beverage traversing conduit 24, the beverage delivery flow path is maintained opened thereby allowing residual beverage pushed by air to be released from the package through the beverage outlet 23. The valve may also be moved by the activation rod to close the irradiation chamber and possibly also to force or assist the fluid connector to move backward (FIG. 22).

In general, for the fluid connector 5 to be moved in translation or rotation, the machine comprises an actuating mechanism 68 which actuation is controlled by the control unit. The mechanism may comprises a pusher 69 arranged in a guide 70 for reciprocal translation and rotation. A return spring 71 is mounted between the pusher and guide to return the pusher in rest position (FIG. 16). The pusher is pushed by a motor 73 or similar actuator which is driven by the control unit (FIG. 13).

Figure 24:
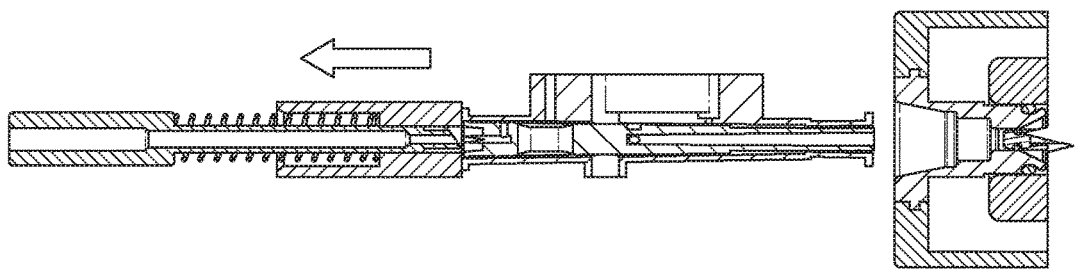
FIG. 24 is a final operation of de-connection of the fitment from the machine.

After few seconds, the injection of pressurized air is stopped and the packaging is positioned at is release location in order to be extracted by the user as shown in FIG. 24.

Of course, the apparatus and its controls can be simplified when using the fitment according to the second embodiment. In particular, the actuating mechanism only acts in pure reciprocal translation.

In the present description, the fluid connector is described as displaceable relative to the housing. It must be kept in mind that it covers the variants of fitment where the fluid connector is stationary relative to the sealing portion of the fitment and the housing is displaceable (e.g. telescopically retractable).

Although the present disclosure has been described by way of example, it should be appreciated that variations and modifications may be made without departing from the scope of the present disclosure as defined in the claims. Furthermore, where known equivalents exist to specific features, such equivalents are incorporated as if specifically referred in this specification.

The invention claimed is:

1. A fitment for a package for preparing a beverage connectable to a machine for supplying sanitized liquid to the package, wherein the fitment comprises:
   a sealing portion for sealing to a container;
   a housing and a fluid connector for fluidly connecting to a liquid supply and treatment unit of the machine and to supply liquid inside the container, wherein the housing is configured as a guiding tube for housing the fluid connector, the housing having a front end opening for enabling the frontal portion of the fluid connector to extend beyond the housing in the treatment position and a rear end opening for forming a passage to a pusher of the machine for enabling the pusher to move the fluid connector into the treatment position; and
   wherein the fluid connector is arranged in the housing to be displaceable between a storage position in which the fluid connector is enclosed in the housing and a treatment position in which at least a frontal portion of the fluid connector including its tip with a liquid inlet extends beyond the housing.

2. The fitment according to claim 1, wherein the fluid connector is sealingly arranged in the housing in aseptically stored condition.

3. The fitment according to claim 1, wherein the fluid connector is arranged in the housing to be slidably moveable between the storage position and the treatment position.

4. The fitment according to claim 1, wherein each of the front end opening and the rear end opening is sealed by a breakable, tearable, or removable sealing part.

5. The fitment according to claim 1, wherein the frontal portion of the fluid connector including its tip extendable beyond the housing in treatment position is of at least 5 mm.

6. A fitment for a package for preparing a beverage connectable to a machine for supplying sanitized liquid to the package, wherein the fitment comprises:
   a sealing portion for sealing to a container;
   a housing and a fluid connector for fluidly connecting to a liquid supply and treatment unit of the machine and to supply liquid inside the container, wherein the fluid connector comprises a portion of a needle comprising a longitudinal liquid conduit extending axially along the portion of needle from the liquid inlet at the tip to at least one liquid outlet positioned and/or extending transversally to the longitudinal liquid conduit; and
   a beverage delivery inlet communicating with a beverage delivery conduit and beverage delivery outlet; and
   wherein the fluid connector is arranged in the housing to be displaceable between a storage position in which the fluid connector is enclosed in the housing and a treatment position in which at least a frontal portion of the fluid connector including its tip with a liquid inlet extends beyond the housing;
   wherein the liquid outlet of the fluid connector is positioned to match, when the fluid connector is moved towards or into the treatment position, with a second liquid inlet in the housing communicating with a liquid conduit and a liquid outlet formed on a compartmenting surface of the fitment intended to define a part of the product compartment of the container.

7. The fitment according to claim 6, wherein the housing comprises an elongated portion of nozzle protruding from the sealing portion and enclosing the portion of needle of the fluid connector including its tip.

8. The fitment according to claim 6, wherein the frontal portion of the fluid connector including its tip extendable beyond the housing in treatment position is of at least 5 mm.

9. The fitment according to claim 6, wherein the fluid connector is arranged rotatable in the housing and comprises a beverage traversing conduit arranged to match with the beverage delivery conduit and with the beverage delivery outlet upon a certain angular rotation of the fluid connector in the housing.

10. The fitment according to claim 9, wherein the beverage traversing conduit and liquid outlet of the fluid connector are longitudinally distant one another and also angularly distant one another.

11. A fitment for a package for preparing a beverage connectable to a machine for supplying sanitized liquid to the package, wherein the fitment comprises:
   a sealing portion for sealing to a container;
   a housing and a fluid connector for fluidly connecting to a liquid supply and treatment unit of the machine and to supply liquid inside the container, wherein the fluid connector comprises a portion of a needle comprising a longitudinal liquid conduit extending axially along the portion of needle from the liquid inlet at the tip to at least one liquid outlet positioned and/or extending transversally to the longitudinal liquid conduit, and wherein the fluid connector further comprises an air inlet, an air conduit, and an air outlet, wherein the air outlet is arranged to match with an air inlet of the housing leading to an air outlet at the compartmenting surface of the fitment; and wherein the fluid connector is arranged in the housing to be displaceable between a storage position in which the fluid connector is enclosed in the housing and a treatment position in which at least a frontal portion of the fluid connector including its tip with a liquid inlet extends beyond the housing; and wherein the liquid outlet of the fluid connector is positioned to match, when the fluid connector is moved towards or into the treatment position, with a second liquid inlet in the housing communicating with a liquid conduit and a liquid outlet formed on a compartmenting surface of the fitment intended to define a part of the product compartment of the container.

12. The fitment according to claim 11, wherein the housing comprises an elongated portion of nozzle protruding from the sealing portion and enclosing the portion of needle of the fluid connector including its tip.

13. The fitment according to claim 11, wherein the frontal portion of the fluid connector including its tip extendable beyond the housing in treatment position is of at least 5 mm.

14. The fitment according to claim 11, wherein the air inlet of the fluid connector is arranged along the axial direction at the distal end of the fluid connector.

* * * * *